United States Patent [19]

Daguet et al.

[11] Patent Number: 4,870,826
[45] Date of Patent: Oct. 3, 1989

[54] CASING FOR A TURBOJET ENGINE COMBUSTION CHAMBER

[75] Inventors: Alain P. M. Daguet, Evry; Pierre A. Glowacki, Fontaine Le Port; Hervé Lassignardie, Nangis, all of France

[73] Assignee: Societe Nationale d'Etude et de Construction de Moteurs d'Aviation (SNECMA), Paris, France

[21] Appl. No.: 203,765

[22] Filed: Jun. 8, 1988

[30] Foreign Application Priority Data

Jun. 18, 1987 [FR] France .................. 87 08503

[51] Int. Cl.[4] .............................................. F02C 7/04
[52] U.S. Cl. ...................................... 60/751; 60/39.07
[58] Field of Search .................. 60/751, 39.07, 39.75, 60/722

[56] References Cited

U.S. PATENT DOCUMENTS

| | | | |
|---|---|---|---|
| 3,394,543 | 7/1968 | Slattery | 60/751 |
| 3,777,489 | 12/1973 | Johnson et al. | 60/39.07 |
| 3,877,221 | 4/1975 | Lefebvre et al. | 60/751 |
| 3,905,191 | 9/1975 | Matto | 60/39.07 |
| 4,796,429 | 1/1989 | Verdouw | 60/751 |

Primary Examiner—Louis J. Casaregola
Assistant Examiner—Timothy S. Thorpe
Attorney, Agent, or Firm—Bacon & Thomas

[57] ABSTRACT

A casing structure for an annular combustion chamber of a turbojet engine is disclosed in which air is tapped from an upstream end portion of the casing, while at the same time preventing contamination of such tapped air from the injected fuel. The casing has annular inner and outer walls disposed on either side of the combustion chamber. The casing has an upstream end which is attached to the downstream end of the exhaust gas turbine. The outer annular casing wall defines circumferentially spaced apart fuel injector orifices and circumferentially spaced apart air tapping orifices which are circumferentially alternating with the fuel injector orifices. A partition wall extending between an air diffuser and the inner surface of the outer annular wall divides the radial space separating the diffuser and the outer annular wall into first cavities which communicate with the air tapping orifices and second cavities which communicate with the interior space between the inner and outer annular walls. The partition serves to completely separate the cavities preventing contamination of the tapped air by the injected fuel.

11 Claims, 5 Drawing Sheets

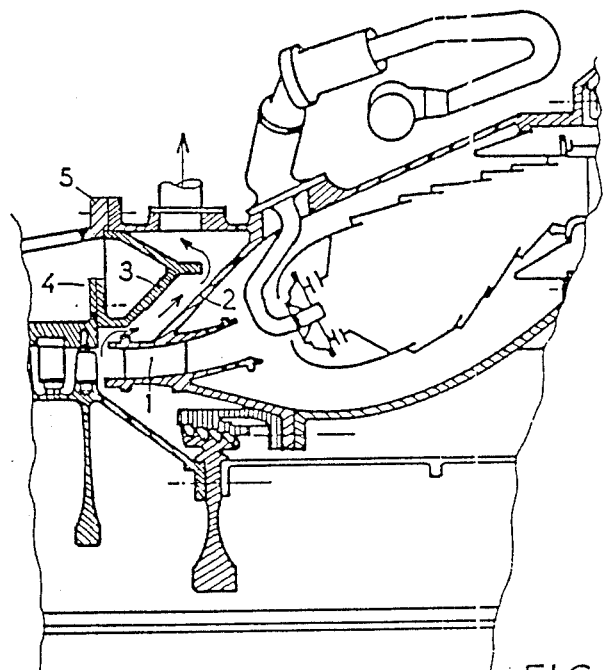
FIG:1
PRIOR ART
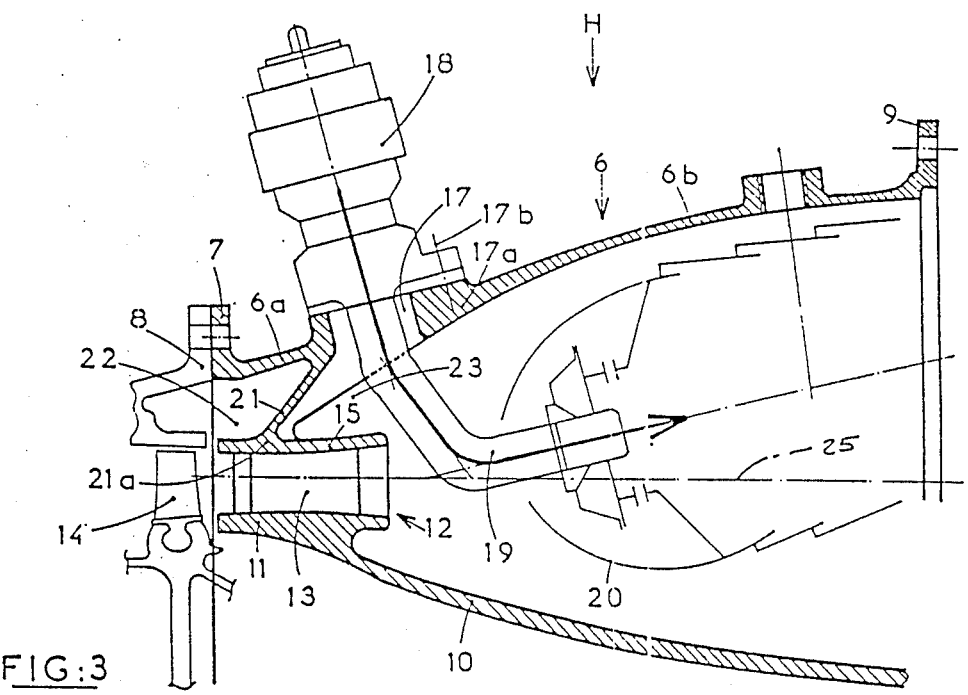
FIG:3

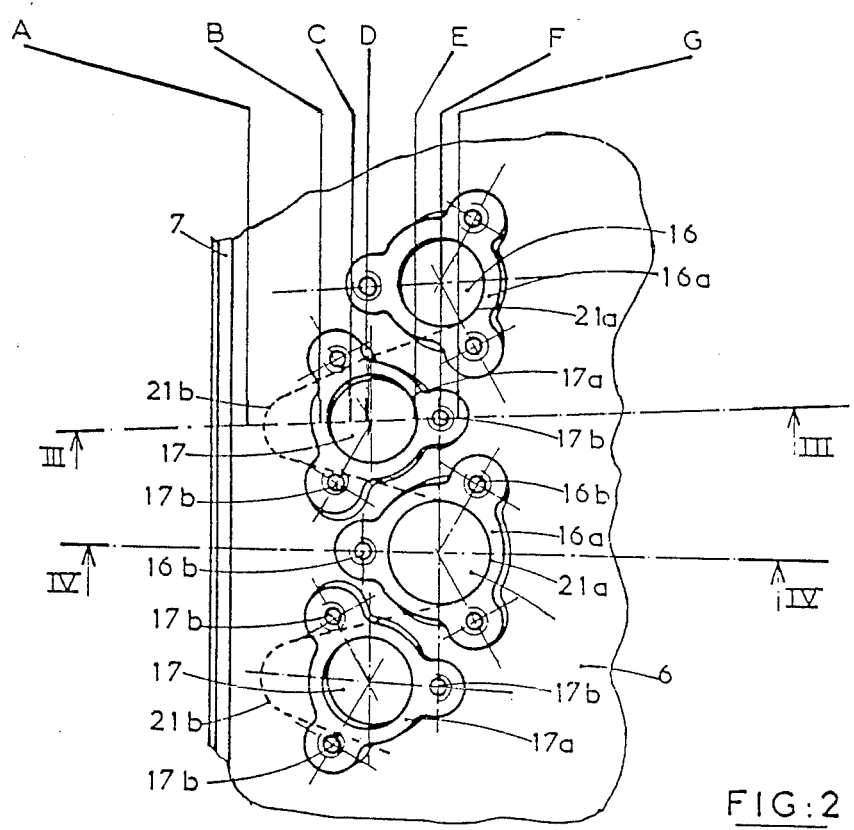
FIG:2
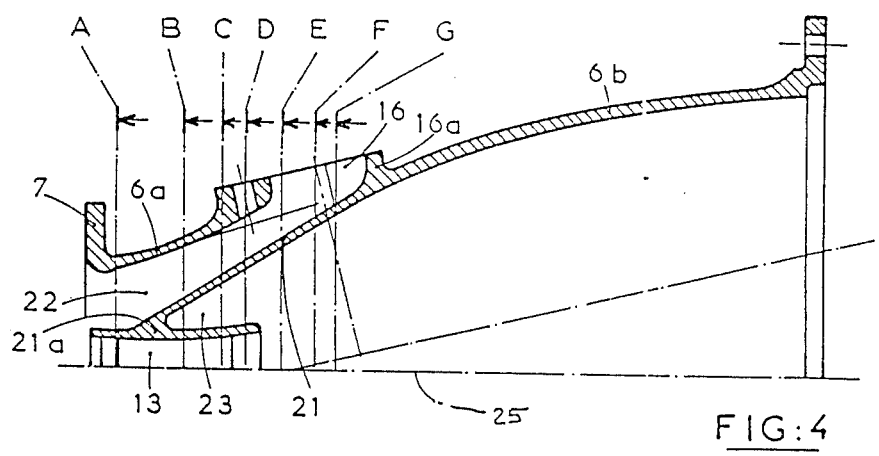
FIG:4

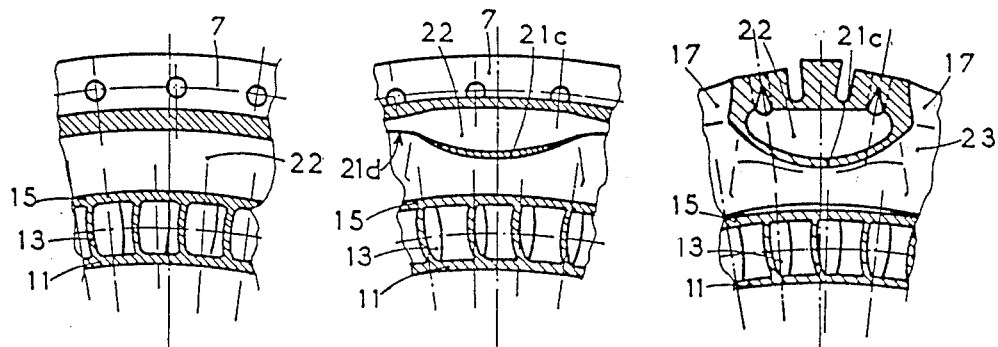
FIG:6a  FIG:6b  FIG:6c
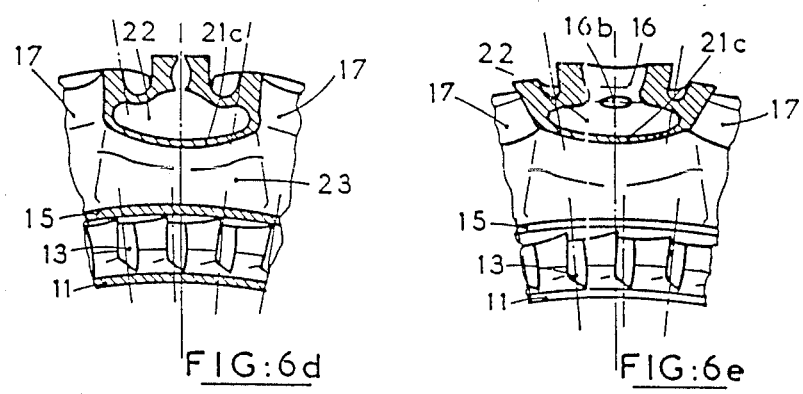
FIG:6d  FIG:6e
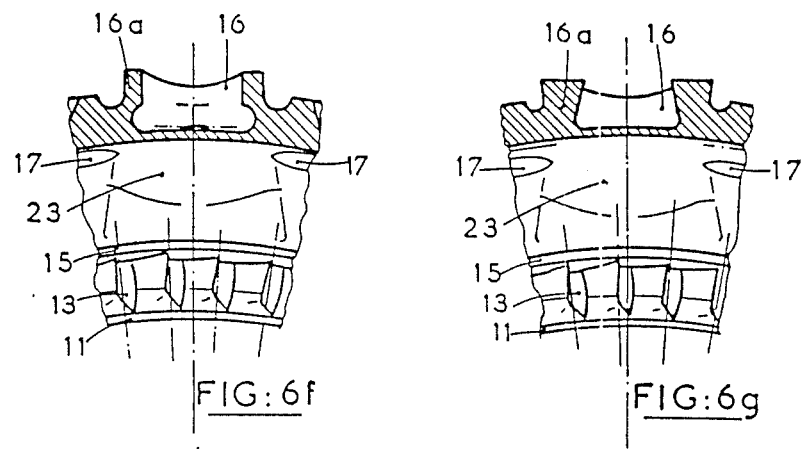
FIG:6f  FIG:6g

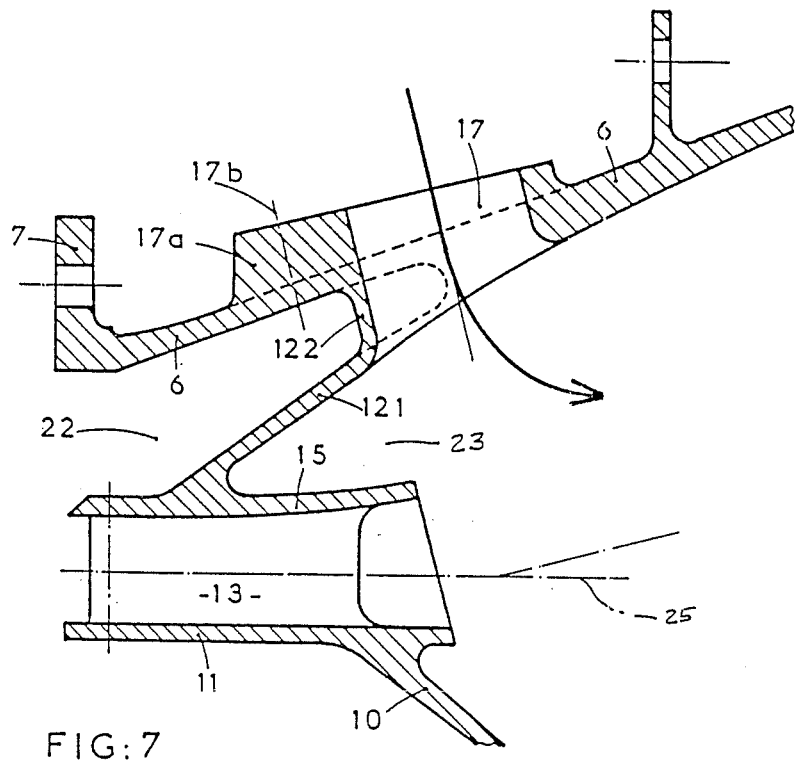
FIG:7
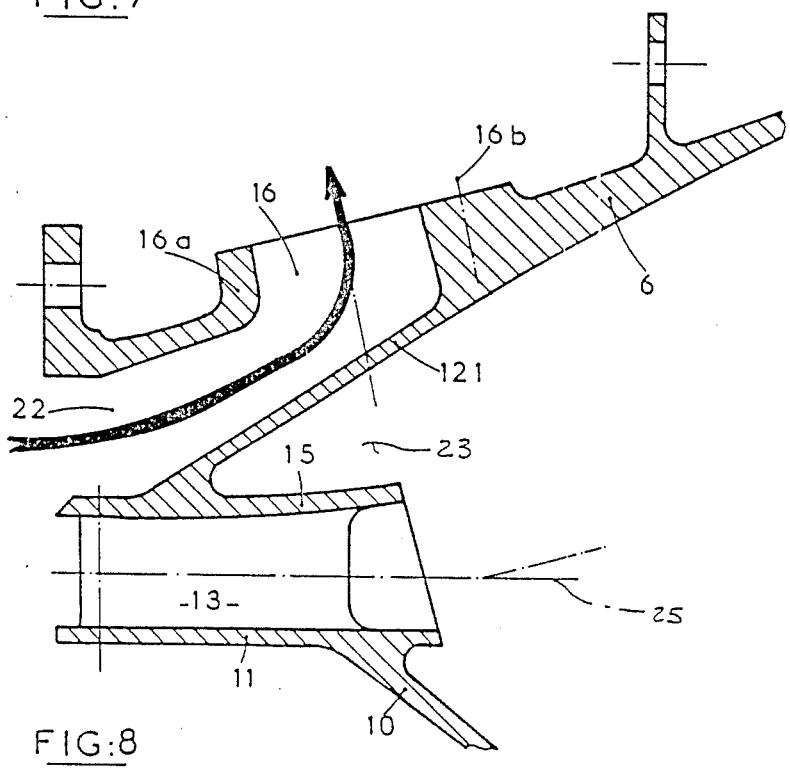
FIG:8

CASING FOR A TURBOJET ENGINE COMBUSTION CHAMBER

BACKGROUND OF THE INVENTION

The present invention relates to a casing structure for a turbojet engine combustion chamber, more particularly, such a turbojet engine utilized in aircraft with free turbines or dual, counter-rotating "prop fans".

In turbojet engines presently in use, air may be tapped from the combustion chamber in order to supply various needs in the aircraft, such as cabin pressurization. It is necessary to tap the air from the combustion chambers when the air that is tapped from a compressor upstream of the combustion chamber no longer sufficies for adequate pressurization. This circumstance is most often encountered when the aircraft is descending from high altitude.

The mechanism utilized to tap the air from the combustion chambers must be such that the air is not mixed with fuel in suspension. This is carried out in known engines by air-tap pipes which receive air from a chamber located between the exit of the high pressure compressor and the entrance to the combustion chamber proper. A typical prior art layout is illustrated in FIG. 1 in which the air flow from a tap location upstream of the diffuser 1 is illustrated by the arrows. A forward end of the combustion chamber has a frusto-conical collar 2 which, along with upstream collar 3, defines an air-tap passage. The collar 3 has a connecting flange 4 which is attached to the outlet end of the high pressure compressor, while a fastening flange 5 interconnects the upstream end of the combustion chamber to an outer casing.

This known system suffers from several significant drawbacks. First, the fuel injectors must be located downstream of the collar 2 so as to avoid contamination of the tapped air and must also extend into the upstream end of the combustion chamber. This requires that they be formed in a complex elbow shape to ensure that the fuel injection takes place in the proper location in the combustion chamber, a shape which serves to hamper the assembly of the structure.

Second, this design unduly increases the overall length of the engine, since the air-tap structure must be interposed between the compressor and the combustion chamber. In order to provide the maximum usable air frame space, it is desirable to minimize the dimensions of the turbojet engine as much as possible.

SUMMARY OF THE INVENTION

A casing structure for an annular combustion chamber of a turbojet engine is disclosed in which air is tapped from an upstream end portion of the casing, while at the same time preventing contamination of such tapped air from the injected fuel. The casing has annular inner and outer walls disposed on either side of the combustion chamber. The casing has an upstream end which is attached to the downstream end of the high-pressure compressor, while the downstream end is attached to the exhaust gas turbine.

The outer annular casing wall defines circumferentially spaced apart fuel injector orifices and circumferentially spaced apart air tapping orifices which are circumferentially alternating with the fuel injector orifices. A partition wall extending between an air diffuser and the inner surface of the outer annular wall divides the radial space separating the diffuser and the outer annular wall into first cavities which communicate with the air tapping orifices and second cavities which communicate with the interior space between the inner and outer annular walls. The partition serves to completely separate the cavities, thereby preventing contamination of the tapped air by the injected fuel.

The overall length of the turbojet engine is minimized, since the casing which surrounds the annular combustion chamber is connected directly to the high-pressure compressor at its upstream end and the exhaust gas turbine at its downstream end. Thus, the need for a separate air tapping casing or manifold is eliminated.

The casing also enables the injection tubes to be formed with a simpler shape, thereby not only improving their operation, but reducing the time necessary for their assembly or their replacement.

In order to reduce the circumferential distance between adjacent fuel injection orifices and air tapping orifices, the orifices may be axially staggered.

BRIEF DESCRIPTION OF THE DRAWINGS

FIG. 1 is a partial, cross-sectional view showing the air tapping casing according to the prior art.

FIG. 2 is a partial, top plan view of a combustion chamber casing according to the invention showing the air tapping and fuel injector orifices.

FIG. 3 is a partial, longitudinal cross-sectional view taken along line III—III in FIG. 2.

FIG. 4 is a partial, longitudinal cross-sectional view showing a portion of the outer casing wall taken along line IV—IV in FIG. 2.

FIGS. 6a–6g are partial, cross-sectional views taken along planes A-G in FIG. 4.

FIGS. 7 and 8 are partial, longitudinal cross-sectional views similar to FIGS. 3 and 4 showing a second embodiment of the casing according to the invention.

DETAILED DESCRIPTION OF THE PREFERRED EMBODIMENTS

Figure 5:
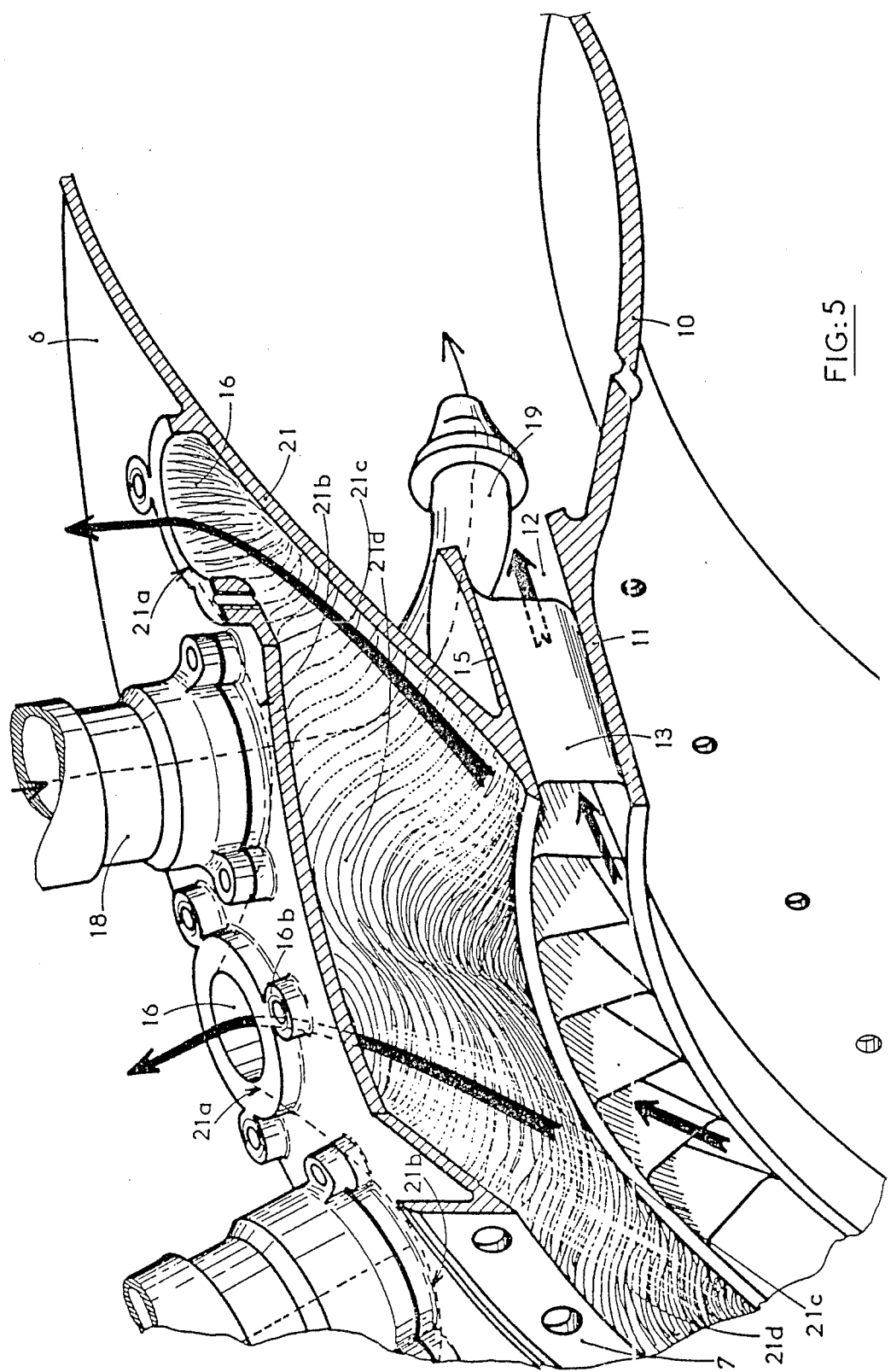
FIG. 5 is a partial, perspective view, partially broken away, illustrating the casing according to the invention.

FIGS. 2–6 illustrate a first embodiment of the casing according to the invention wherein the casing comprises an outer annular wall 6 having an upstream end 6a, attached to the casing 8 of the high-pressure compressor via radially extending flange 7. A downstream portion 6b of the wall 6 is attached to an exhaust gas turbine (not shown) via radially extending flange 9.

The casing according to the invention also comprises inner annular wall 10 having an upstream end attached to inner diffuser wall 11 of air diffuser 12. Air diffuser 12 has a plurality of vanes 13 extending in a generally radial direction between inner diffuser wall 11 and outer diffuser wall 15. The vanes 13 serve to guide high-pressure air emanating from the last stage 14 of the high-pressure compressor into the space defined between the inner and outer annular walls 10 and 6, respectively.

The casing 6 is oriented such that outer annular wall 6 is disposed radially outwardly of combustion chamber 20, while inner annular wall 10 is disposed radially inwardly thereof.

Outer casing wall 6 defines a plurality of circumferentially spaced apart air-tapping orifices 16 and a plurality of circumferentially spaced apart fuel injector orifices 17. Fuel injectors 18 are attached to mounting bosses 17a via bolts inserted into mounting holes 17b such that the fuel injection nozzle tubes 19 extend into the casing and the combustion chamber 20. In known fashion, fuel injected through the injector nozzle tube 19 is mixed with air passing through diffuser 12 and ignited within the combustion chamber to produce the desired thrust.

Air tapping pipes or conduits (not shown) may be attached to mounting bosses 16a via bolts or screws extending into mounting holes 16b.

As best illustrated in FIG. 2, the air tapping orifices 16 are circumferentially alternating with the fuel injector orifices 17 about the periphery of the casing. If the circumferential spacing between the adjacent orifices is sufficient to accommodate the mounting bosses, the air tapping orifices 16 and the fuel injection orifice 17 may lie in a common plane extending generally perpendicular to longitudinal axis 25. Axis 25 extends between the upstream and downstream ends of the casing in a direction generally parallel to the longitudinal axis of the turbine engine.

However, in order to reduce the circumferential spacing between the fuel injector orifices and the air tapping orifices, their respective planes may be axially offset as illustrated in FIG. 2. The plane of the air tapping orifices is axially displaced from the plane of the fuel injector orifices in a direction toward the upstream edge of the casing.

A partition 21 extends between the diffuser wall 15 and outer annular wall 6 so as to divide the radial spacing therebetween into a plurality of first cavities 22 and second cavities 23. As best illustrated in FIG. 4, first cavities 22 communicate with air-tapping orifices 16. Second cavities 23 communicate with the space between the outer annular wall 6 and the inner annular wall 10 of the casing. Partition 21 may be angularly disposed such that the portion connecting with diffuser wall 15 is located upstream of the portion connecting with outer annular wall 6. The juncture of partition 21 with outer annular wall 6 is illustrated in dashed lines 21b in FIG. 2, and passes upstream of the fuel injection orifices 17 and downstream of the air tapping orifices 16. Partition 21 serves to completely isolate the cavities 22 from the cavities 23, thereby preventing any possibility that air tapped from orifice 16 is contaminated with fuel from the fuel injectors.

In the embodiment shown in FIGS. 2-6, partition 21 has an undulating or corrugated cross-section taken in a plane taken generally perpendicular to the axis 25. FIG. 5 and FIGS. 6a-6g show the undulating nature of the partition wall 21. FIG. 6a is a partial cross-sectional view taken along plane A in FIG. 4. The remaining FIGS. 6b-6g represent partial cross-sections taken through planes B-G, respectively. Partition 21, illustrated from an upstream viewpoint in FIG. 5, assumes an essentially frusto-conical shape 21c in the sectional planes taken through air tapping orifices 16 and defines "bosses" 21d across the planes of the fuel injection orifices where partition 21 joins the outer annular wall 6 at 21b.

FIGS. 7 and 8 show an alternative embodiment of the partition. In these figures, elements similar to that of the first embodiment are denoted by the same reference numerals. As can be seen, partition 121 extends between the diffuser wall 15 and the outer annular wall 6 to separate the cavities 22 and 23. The partition 121 has a generally frusto-conical cross-section without the undulations of the previous embodiments. Partition 121 has radial components 122 connected to the outer annular wall 6 upstream of the fuel injection orifices 17. Partition 121 extends in its generally conical direction to join with outer annular wall 6 downstream of the air tapping orifices 16, as illustrated in FIG. 8. As in the first embodiment, fuel contamination of the air tapped from orifices 16 is positively prevented due to the continuous nature of the partition separating the air tapping cavities from the fuel injection cavities.

The invention also eliminates the need for tapping of air along the combustion chamber casing itself, which air is normally utilized to supply cooling films on the inner surface of the combustion chamber to prevent overheating of the chamber. By enabling sufficient air to be tapped upstream of the cooling air, the full amount of air may be utilized to establish the cooling films and prevent overheating of the combustion chamber.

The foregoing description is provided for illustrative purposes only and should not be construed as in any way limiting this invention, the scope of which is defined solely by the appended claims.

What is claimed is:

1. A casing for an annular combustion chamber of a gas turbine engine having an air compressor and an exhaust gas turbine, comprising:
   (a) an inner annular wall having upstream and downstream ends, the inner annular wall disposed radially inwardly of the annular combustion chamber;
   (b) an outer annular wall disposed generally concentrically about the inner annular wall and radially outwardly of the annular combustion chamber, the outer annular wall having an upstream end, a downstream end, and defining:
      (i) a plurality of fuel injector orifices circumferentially spaced apart; and
      (ii) a plurality of air tapping orifices circumferentially spaced apart and alternating circumferentially with the fuel injector orifices;
   (c) air diffuser means located adjacent to the upstream ends of the inner and outer annular walls and radially spaced from the outer annular wall; and,
   (d) a partition extending between the air diffuser means and the outer annular wall dividing the radial space therebetween into a plurality of first cavities communicating with the air tapping orifices and a plurality of second cavities communicating with the interior space between the inner and outer annular walls wherein the partition has an undulating annular cross-sectional shape taken in a plane exending generally perpendicular to an axis exending between upstream and downstream ends of the outer annular wall.

2. The casing according to claim 1 wherein the plurality of fuel injector orifices lie in a first plane extending generally perpendicular to an axis extending between upstream and downstream ends of the outer annular wall and wherein the plurality of air tapping orifices lie in a second plane extending generally parallel to, but axially spaced from, the first plane.

3. The casing according to claim 2 wherein the second plane is spaced from the first plane in a direction toward the upstream end of the outer annular wall.

4. The casing according to claim 1 wherein the partition has an upstream end attached to the air diffuser means and a downstream end attached to the outer annular wall.

5. The casing according to claim 4 wherein the juncture of the downstream end of the partition and the outer annular wall passes upstream of the fuel injector orifices and downstream of the air tapping orifices.

6. The casing according to claim 5 wherein the plurality of fuel injector orifices lie in a first plane extending generally perpendicular to an axis extending between upstream and downstream ends of the outer annular wall and wherein the plurality of air tapping orifices lie in a second plane extending generally parallel to, but axially spaced from, the first plane.

7. The casing according to claim 6 wherein the second plane is spaced from the first plane in a direction toward the upstream end of the outer annular wall.

8. The casing according to claim 1 wherein the partition has a generally frusto-conical shape with an upstream end attached to the air diffuser means and a downstream end attached to the outer annular wall.

9. The casing according to claim 8 wherein the juncture of the downstream end of the partition and the outer annular wall passes upstream of the fuel injector orifices and downstream of the air tapping orifices.

10. The casing according to claim 9 wherein the plurality of fuel injector orifices lie in a first plane extending generally perpendicular to an axis extending between upstream and downstream ends of the outer annular wall and wherein the plurality of air tapping orifices lie in a second plane extending generally parallel to, but axially spaced from, the first plane.

11. The casing according to claim 10 wherein the second plane is spaced from the first plane in a direction toward the upstream end of the outer annular wall.

* * * * *

UNITED STATES PATENT AND TRADEMARK OFFICE
CERTIFICATE OF CORRECTION

PATENT NO. : 4,870,826

DATED : October 3, 1989

INVENTOR(S) : Alain P. M. DAGUET, ET AL

It is certified that error appears in the above-identified patent and that said Letters Patent is hereby corrected as shown below:

Claim 1, line 48, "exending" should be --extending--.

Claim 1, line 49, "exending" should be --extending--.

Signed and Sealed this

Second Day of July, 1991

Attest:

HARRY F. MANBECK, JR.

*Attesting Officer*      *Commissioner of Patents and Trademarks*